United States Patent [19]
Rondeau

[11] Patent Number: 5,502,784
[45] Date of Patent: Mar. 26, 1996

[54] HEAT INSULATING CONNECTOR FOR PLASTIC OPTICAL FIBERS

[75] Inventor: Michel Y. Rondeau, San Jose, Calif.

[73] Assignees: Valquest Medical, Inc.; Fibotech, Inc., both of San Jose, Calif.

[21] Appl. No.: 269,710

[22] Filed: Jul. 1, 1994

[51] Int. Cl.⁶ .................................................. G02B 6/36
[52] U.S. Cl. ..................... 385/66; 385/58; 385/77; 385/81; 385/84; 385/88
[58] Field of Search ....................... 385/60, 66, 58, 385/72, 75, 77, 81, 84, 85, 88

[56] References Cited

U.S. PATENT DOCUMENTS

| | | | |
|---|---|---|---|
| 4,023,886 | 5/1977 | Nakayama et al. | 385/80 |
| 4,076,379 | 2/1978 | Chouinard | 385/60 X |
| 4,173,389 | 11/1979 | Curtis | 385/92 |
| 4,205,897 | 6/1980 | Stankos | 385/60 |
| 4,470,660 | 9/1984 | Hillegonds et al. | 385/58 |
| 4,740,047 | 4/1988 | Abe et al. | 385/84 |
| 4,869,571 | 9/1989 | Hubner et al. | 385/77 |
| 5,042,900 | 8/1991 | Parker | 385/76 |
| 5,113,464 | 5/1992 | Wall | 385/81 |
| 5,275,596 | 1/1994 | Long et al. | 606/28 |
| 5,276,752 | 1/1994 | Gugelmeyer et al. | 385/69 |
| 5,282,258 | 1/1994 | Hoshino | 385/70 |
| 5,305,406 | 4/1994 | Rondeau | 385/81 |

*Primary Examiner*—Rodney B. Bovernick
*Assistant Examiner*—Hemang Sanghavi
*Attorney, Agent, or Firm*—Robert O. Guillot

[57] ABSTRACT

A connector for plastic optical fibers having improved heat resistance properties including a metallic core and a heat insulative tubular sleeve which surrounds the optical fiber. The outward tip of the metallic core is deformed to provide a mechanical, frictional engagement of the sleeve and optical fiber within the connector.

19 Claims, 1 Drawing Sheet

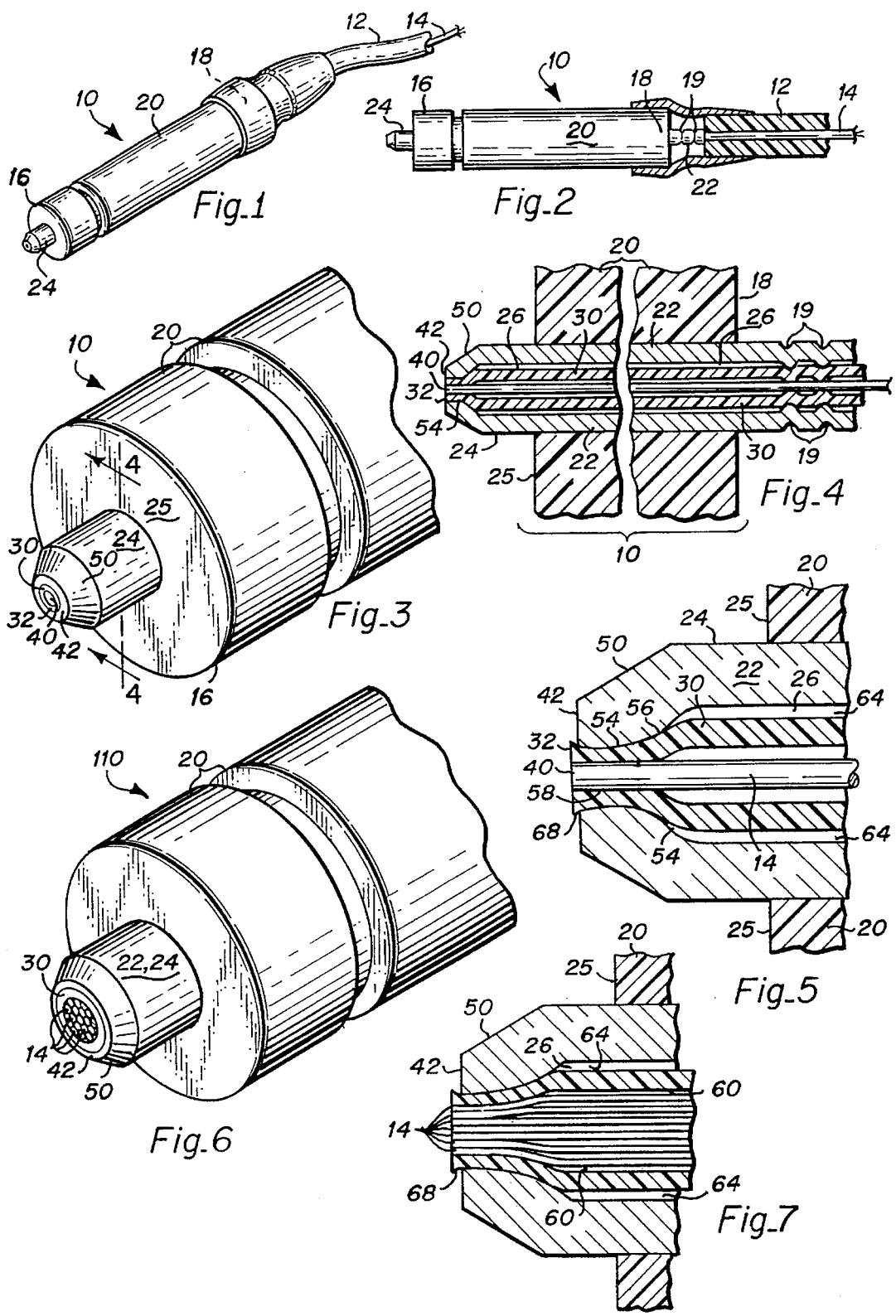

5,502,784

HEAT INSULATING CONNECTOR FOR PLASTIC OPTICAL FIBERS

BACKGROUND OF THE INVENTION

1. Field of the Invention

This invention relates generally to connectors for plastic optical fibers and more particularly to a connector having a heat insulating sleeve disposed between the optical fiber and a metal connector core member.

2. Description of the Prior Art

Connectors for plastic optical fibers are well known. Such connectors typically use an epoxy or other type of glue substance to fixedly engage the plastic fiber within the connector body. An improvement over the usage of such glues is taught in U.S. Pat. No. 5,305,406, issued Apr. 19, 1994 by Michel Rondeau, the inventor herein. This improvement includes a mechanical, frictional engagement of the optical fiber within a metallic core member of the connector.

A problem with plastic optical fibers held within metallic core connectors occurs when a high energy optical source is utilized to input light energy into the end of the plastic fiber. Heat from the source on the metal ferrule has been known to cause deformation and shrinkage of the plastic optical fiber within the connector body, which renders the device inoperative.

SUMMARY OF THE INVENTION

The present invention utilizes a metal core fiberoptic connector, such as is taught in U.S. Pat. No. 5,305,406. A heat insulating sleeve is engaged around the plastic optical fiber within the metal core. Thereafter, the protruding metal tip of the metal core is uniformly deformed, as taught in U.S. Pat. No. 5,305,406, and the deformed metal tip mechanically holds both the sleeve and the optical fiber within the connector body.

It is an advantage of the present invention that a heat resistant plastic optical fiber connector is obtained.

It is another advantage of the optical connector of the present invention that higher energy light beams can be projected through the optical fiber.

It is a further advantage of the optical fiber connector of the present invention that a heat insulating sleeve is mechanically engaged in the tip of connector around an optical fiber within a metal connector core, such that the usage of gluing compounds is eliminated.

These and other objects and advantages of the present invention will become apparent to one of ordinary skill in the art upon reviewing the following detailed description of the preferred embodiment.

DESCRIPTION OF THE DRAWINGS

FIG. 1 is a perspective view of a connector of the present invention;

FIG. 2 is a side elevational view of the connector depicted in FIG. 1;

FIG. 3 is an enlarged perspective view of the end of the connector depicted in FIG. 1;

FIG. 4 is a cross-sectional view taken along lines 4—4 of FIG. 3;

FIG. 5 is an enlarged view of the swaged tip of FIG. 4;

FIG. 6 is an enlarged perspective view of the end of a multifiber connector of the present invention; and FIG. 7 is an enlarged cross-sectional view of the swaged tip of the connector depicted in FIG. 6.

DESCRIPTION OF THE PREFERRED EMBODIMENTS

As depicted in FIGS. 1 and 2, the optical fiber connector 10 of the present invention is engaged to the end of a fiberoptic cable 12. The optical fiber 14 within the fiberoptic cable 12 is disposed within a metal core member 22 within the body 20 of the connector 10 and is exposed at the forward end 16 of the connector 10. The optical fiber 14 is engaged within the rearward end 18 of the connector by crimping 19 the metal core 22 around the optical fiber at the connector end 18, as is well known in the art and generally depicted in FIG. 4.

FIG. 3 is an enlarged view of the end 16 of the connector 10, and FIG. 4 is a cross-sectional view of the end 16 depicted in FIG. 3 taken long lines 4—4 of FIG. 3. As depicted in FIGS. 3 and 4, the connector 10 includes a plastic body 20 which is molded about a metallic core member 22, which has a hollow bore 26 formed therethrough. The body 20 depicted in FIGS. 1, 2 is a generalized body shape. The present invention is not limited to connectors having this depicted body shape, nor to connectors having a plastic body member. Rather, it is within the scope of the invention that the body portion of the connector 10 may have any shape or configuration and be composed of metal, plastic or other suitable material.

An end tip portion 24 of the metal core 22 projects outwardly from the end face 25 of the molded body 20. A tubular heat insulating sleeve 30 is disposed within the bore 26, such that an external end 32 of the insulating sleeve 30 projects within the central bore 26 at the tip 24 of the metal core 22. The plastic optical fiber 14 projects throughout and within the tubular sleeve 30, such that the end 40 of the fiber 14 is exposed at the tip 24 of the metal core 22. Thus, the end surface 42 of the tip 24 concentrically exposes the end 40 of the fiber 14, surrounded by the end 32 of the insulating sleeve 30, surrounded by the exposed metal tip 24 of the core member 22. The external surface 50 of the tip 24 is uniformly, radially, inwardly deformed, such as by an impact deformation device, to hold the optical fiber 14 and insulating sleeve 30 therewithin, as is next discussed.

The manufacturing of the present invention is preferably accomplished utilizing the device and technology taught in U.S. Pat. No. 5,305,406, the teachings of which are incorporated herein by reference. Specifically, utilizing a connector 10 having a suitable metal core member 22, the sleeve 30 and plastic optical fiber 14 are inserted within the bore 26 of the core 22. The sleeve 30 may be inserted upon the fiber 14 prior to insertion within the bore 26, or the sleeve 30 can be inserted in the bore 26 followed by the insertion of the optical fiber 14 within the sleeve 30.

The sleeve 30 and optical fiber 14 are inserted within the bore 26 such that the ends of the sleeve and optical fiber protrude outwardly from the end surface 42 of the tip 24 of the core member 22. Thereafter, as is best seen in FIG. 5, the protruding tip 24 of the metal core 22 is mechanically deformed to create the tapered outer surface 50. The deformation of the outer surface 50 causes the inner surface 54 of the bore 26 to also become deformed, thus narrowing the diameter of the bore 26. The deformed inner surface 54 presses upon and deforms an end portion 56 of the sleeve 30 causing the inner surface 58 of the sleeve 30 to also deform and firmly press against the optical fiber 14. Thus the deformed metal tip 50 mechanically and frictionally clamps the end of the sleeve 30 and the optical fiber 14 together within the tip 24 of the metallic core member. In the preferred embodiment the mechanical deformation of the tip is accomplished in a radially uniform manner, such that the optical fiber remains centrally disposed relative to the connector body, and a uniform mechanical clamping of the sleeve and the fiber is obtained. In the preferred embodiment, the optical fiber 14 fits somewhat loosely within the inner diameter of the sleeve 30, and the sleeve 30 fits somewhat loosely within the inner diameter of the bore 26 of the metal core 22. Thus, as is best seen in FIG. 5, an air gap 60 surrounds the optical fiber 14 within the sleeve 30 and a second air gap 64 surrounds the sleeve 30 within the bore 26.

It is also to be noted, as seen with the aid of FIG. 5, that the preferred embodiment is manufactured such that the exposed ends 32 and 40 of the sleeve 30 and optical fiber 14, respectively, project outwardly 68 a short distance from the end surface 42 of the metal core 22. The outward projection 68 serves to improve the performance of the connector 10 and is accomplished by grinding or polishing the end surfaces of the optical fiber 14 and sleeve 30 after the deformation of the metal tip, so as to leave the slight projection 68. The mechanical, frictional engagement of the optical fiber 14 and sleeve 30 within the bore 26 eliminates the need for gluing substances which can act to inhibit or degrade performance of a connector at higher temperatures.

The sleeve 30 acts to insulate the plastic optical fiber 14 from the heat of the metallic core member when the connector is utilized in a high energy environment. Specifically, without a heat insulating sleeve, a high energy light source that is disposed proximate the end 16 of the connector can provide sufficient initial heat energy to the tip 24 of the metallic core member 22 to cause an unshielded plastic optical fiber 14 to deform, thus causing the performance of such a connector to degrade. The use of the insulating sleeve 30 serves to insulate or shield the plastic optical fiber 14 from the initial heat buildup of the metallic core 22, thus providing a gradual heating of the fiber 14 which eliminates deformation and improves the operational characteristics for the connector. The air gaps 60 and 64 between the optical fiber 14 and the insulating sleeve 30, and between the insulating sleeve 30 and the metal core 22 also aid in providing heat insulating characteristics to the connector 10 at points away from the deformed portion of the tip 24. That is, wherever the optical fiber 14 is tightly held within the connector, an area of increased heat intensity, referred to as a hot spot, can be created. The plastic optical fiber 14 tends to deform at such hot spots; thus, the relatively loosely fitting sleeve 30 which loosely resides within the bore 26, also improves the operational characteristics of the device by eliminating such hot spots. The principal location within the connector in which the optical fiber is tightly held is the relatively small location at the tip 24 where the engagement of the optical fiber 14 occurs. It is to be noted that in the preferred embodiment, the sleeve 30 projects entirely throughout the bore 26 of the metal core 22. Thus, as depicted in FIG. 4, the sleeve 30 projects rearwardly through the crimped engagement 19 of the connector 10 with the optical fiber 14. This extension of the sleeve 30 further serves to protect the optical fiber from hot spots. The utilization of the mechanical, frictional engagement of the optical fiber and insulating sleeve, rather than the utilization of gluing substances (which create a tightly held optical fiber effect and thus promote hot spots), improves the operational characteristics of the connector.

The embodiment depicted in FIGS. 1, 2, 3 and 4 is a connector for a single plastic optical fiber. In a specific example of this embodiment, the optical fiber has a diameter of approximately 0.75 mm the insulating sleeve comprises a Teflon tubular member having a central inner diameter of approximately 0.9 mm and a wall thickness of approximately 0.225 mm, and the metal core member 22 and is composed of copper has a central bore 26 diameter of approximately 1.5 mm. The air gaps 60 and 64 are approximately 0.075 mm. A rough rule of thumb is that the wall thickness of the Teflon sleeve is approximately 15% of the central bore 26 diameter. In the preferred embodiment, the length of the projection 68 is approximately 1.2 to 2.5 mm. It is within the contemplation of the inventor that a plurality of optical fibers can be engaged within an insulating sleeve of a connector as is discussed below in regard to FIGS. 6 and 7.

FIGS. 6 and 7 depict a multi-fiber embodiment of the present invention, wherein similar structures to those described above are identified with identical numerals. Thus, the multifiber connector 110 includes a body portion 20 having a metallic core member 22 disposed therethrough. A plurality of optical fibers 14 are disposed within a tubular insulating sleeve 30 that is preferably composed of Teflon, and the sleeve 30 with optical fibers 14 therewithin is disposed within a bore 26 formed through the metallic core 22. The projecting tip portion 24 of the core 22 is uniformly deformed 50 such that the multiple optical fibers 14 are tightly, mechanically, frictionally held within the sleeve 30 within the tip 24. Air gaps 60 and 64 surround the optical fibers 14 and sleeve 30 respectively, to provide increased heat insulative properties to the device 110. As with the single optical fiber embodiment 10 depicted in FIG. 5, the ends of the optical fiber bundle and sleeve 30 project a short distance 68 outwardly from the end surface 42 of the tip 24. It is within the contemplation of the inventor that such multiple optical fiber connectors are reasonably constructed wherein the bundle of optical fibers 14 has a diameter of as much as 2 inches, and wherein the parameters regarding the diameter and wall thickness of the sleeve 30, together with the diameter of the bore 26 are relatively scalable from the dimensions provided hereinabove for the single fiber embodiment depicted in FIGS. 1–5.

While the present invention has been described with reference to certain preferred embodiments, those of ordinary skill in the art will appreciate that certain modifications and alterations in form and detail may be made to the invention. Thus, it is intended that the following claims cover all such alterations and modifications as may fall within the true spirit and scope of the invention.

What I claim is:

1. An optical fiber connector, comprising:

a connector body member;

a metallic core member being disposed within said body member; such that a tip portion of said metallic core member projects outwardly from an end face of said body member; said core member having a bore formed therethrough;

an optical fiber being disposed within said core member bore;

a tubular heat insulating sleeve member being disposed around said optical fiber and within said core member bore;

an end portion of said sleeve member and an end portion of said optical fiber being disposed within said projecting tip portion of said metallic core member;

said tip portion being mechanically deformed, such that said bore is deformed and reduced in diameter, and such that inner surface portions of said bore are likewise deformed to make mechanical contact with said sleeve member; whereby said optical fiber and said sleeve member are mechanically held and engaged within said tip portion of said core member.

2. A fiberoptic connector as described in claim 1 wherein said end portion of said sleeve member and said end portion of said optical fiber project outwardly from said tip portion of said metallic core member.

3. A fiberoptic connector as described in claim 2 wherein a plurality of optical fibers is disposed within said sleeve member.

4. A fiberoptic connector as described in claim 1 wherein an outer diameter of said optical fiber is less than an inner diameter of said sleeve member, such that an air gap is formed between said optical fiber and said sleeve member.

5. A fiberoptic connector as described in claim 4 wherein a plurality of optical fibers is disposed within said sleeve member and said optical fibers reside loosely within said sleeve member.

6. A fiberoptic connector as described in claim 1 wherein an outer diameter of said sleeve member is less than an inner diameter of said bore, such that an air gap is formed between said sleeve member and an inner surface of said bore.

7. A fiberoptic connector as described in claim 6 wherein a plurality of optical fibers is disposed within said sleeve member.

8. A fiberoptic connector as described in claim 1 wherein a plurality of optical fibers are disposed within said sleeve member.

9. A fiberoptic connector as described in claim 1 wherein a plurality of optical fibers is disposed within said sleeve member.

10. A method for manufacturing a fiberoptic connector utilizing a connector body having a metallic core member disposed therewithin, said core member having a bore formed therethrough, comprising the steps of:

inserting an optical fiber and a tubular heat insulating sleeve within said bore, said optical fiber being disposed within said sleeve;

mechanically deforming a projecting tip portion of said metallic core member such that portions of said metallic core member are caused to mechanically hold said sleeve member and said optical fiber within said tip portion of said metallic core.

11. A method for manufacturing a fiberoptic connector as described in claim 10 wherein said metallic core member is uniformly, radially deformed relative to said sleeve and optical fiber disposed therewithin.

12. A method for manufacturing a fiberoptic connector as described in claim 11 wherein said end portion of said sleeve member and said end portion of said optical fiber project outwardly from said tip portion of said metallic core member.

13. A method for manufacturing a fiberoptic connector as described in claim 12 wherein a plurality of optical fibers are inserted within said sleeve member.

14. A method for manufacturing a fiberoptic connector as described in claim 11 wherein an outer diameter of said optical fiber is less than an inner diameter of said sleeve member, such that an air gap is formed between said optical fiber and said sleeve member.

15. A method for manufacturing a fiberoptic connector as described in claim 14 wherein a plurality of optical fibers is disposed within said sleeve member and said optical fibers reside loosely within said sleeve member.

16. A method for manufacturing a fiberoptic connector as described in claim 11 wherein an outer diameter of said sleeve member is less than an inner diameter of said bore, such that an air gap is formed between said sleeve member and an inner surface of said bore.

17. A method for manufacturing a fiberoptic connector as described in claim 16 wherein a plurality of optical fibers is disposed within said sleeve member.

18. A method for manufacturing a fiberoptic connector as described in claim 11 wherein a plurality of optical fibers are inserted within said sleeve member.

19. A method for manufacturing a fiberoptic connector as described in claim 10 wherein a plurality of optical fibers are inserted within said sleeve member.

* * * * *